C. L. RAYFIELD.
FLEXIBLE COUPLING.
APPLICATION FILED MAR. 19, 1918.
1,348,184.
Patented Aug. 3, 1920.
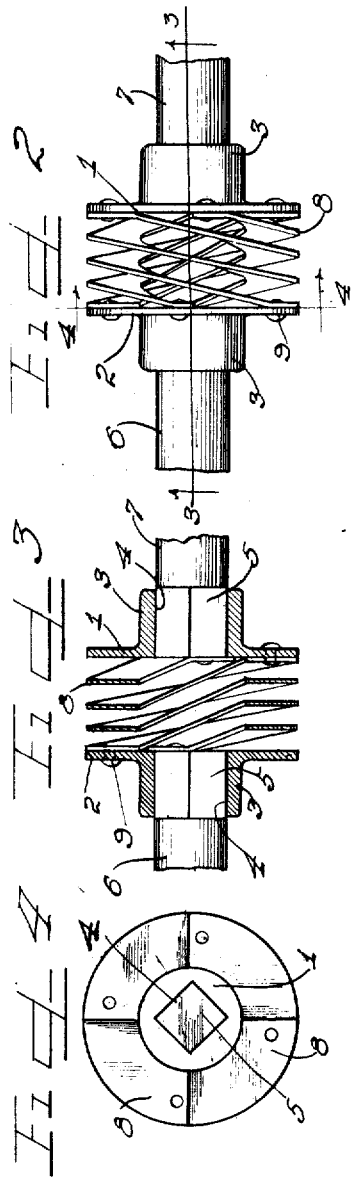
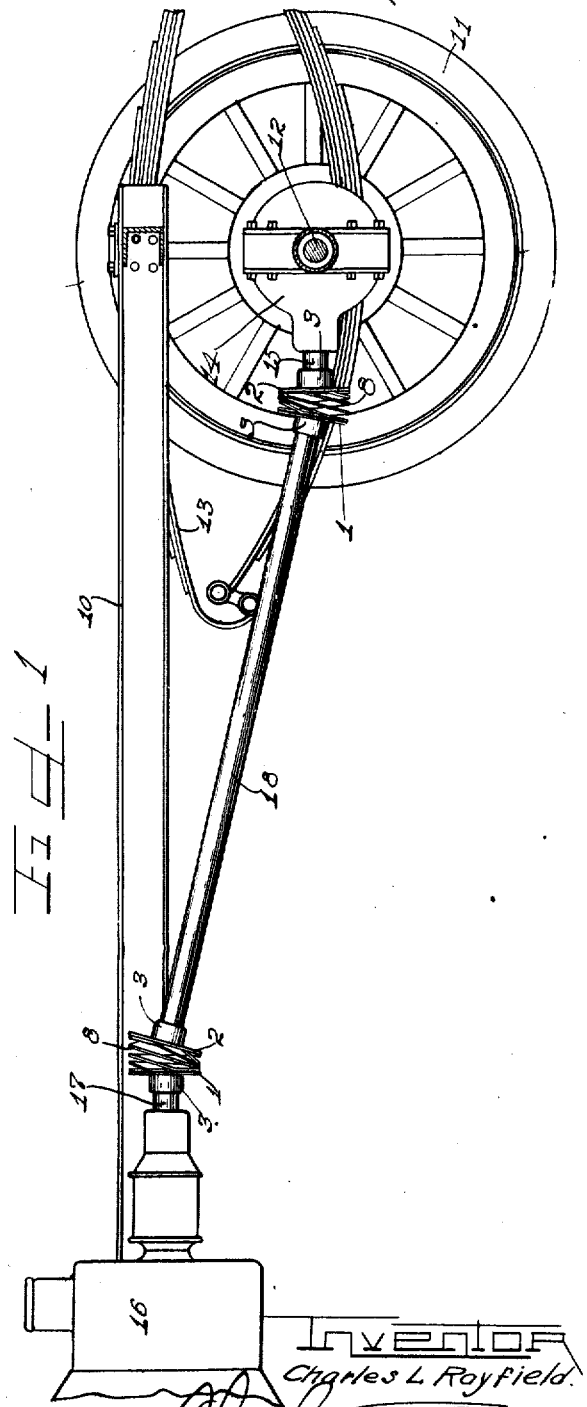

UNITED STATES PATENT OFFICE.

CHARLES L. RAYFIELD, OF CHICAGO, ILLINOIS.

FLEXIBLE COUPLING.

1,348,184.         Specification of Letters Patent.         Patented Aug. 3, 1920.

Application filed March 19, 1918. Serial No. 223,259.

*To all whom it may concern:*

Be it known that I, CHARLES L. RAYFIELD, a citizen of the United States, and a resident of the city of Chicago, in the county of Cook and State of Illinois, have invented certain new and useful Improvements in Flexible Couplings; and I do hereby declare that the following is a full, clear, and exact description of the same, reference being had to the accompanying drawings, and to the numerals of reference marked thereon, which form a part of this specification.

This invention has reference more particularly to a coupling for transmitting power angularly, and is particularly adapted for use where the relation of the two connected parts is variable although it is equally well suited for the transmission of power where the relation of the connected parts is invariable.

An object of my invention is to provide a coupling which will readily adapt itself to longitudinal adjustment of the connected parts.

Another object of my invention is to provide a coupling which will readily adapt itself to different angular adjustments of the connected parts.

Another object of the invention is to provide a flexible coupling in which variable relation of the connected parts is effected by the flexing or bending of elastic connecting means.

Another object of the invention is to provide a flexible connection in which there are no joints or sliding or frictional engaging parts which wear and become loose from constant use of the coupling.

Another object of the invention is to provide a coupling composed of a plurality of spirally formed leaves arranged to provide a yielding connection between the driving and driven parts, and which positively transmits the power from the driving part to the driven part in any of the positions to which the parts may be adjusted by reason of the flexibility of the leaves.

Another object of the invention is to provide a flexible coupling which is particularly suited for connecting the drive shaft of an automobile with the transmission and with the rear axle.

Another object of the invention is to provide a flexible coupling which is simple and inexpensive and which is not liable to get out of order.

The invention also has other important objects which will appear from the following specification and the accompanying drawings.

The invention (in a preferred form) is illustrated and described in the accompanying drawings and specification.

In the drawings:

Figure 1 is a view showing portions of an automobile having my coupling applied thereto.

Fig. 2 is a side view of a coupling constructed in accordance with my invention.

Fig. 3 is a longitudinal section on the line 3—3 of Fig. 3.

Fig. 4 is a view on the line 4—4 of Fig. 2.

As shown on the drawings:

The reference numerals 1 and 2, indicate a pair of coupler plates, each of which may be provided with a hub 3, which may have the squared opening 4, to admit the squared end 5, of the shafts 6 or 7, or the hub 3, may be otherwise formed so that the plates 1 and 2, will turn with the shafts 6 and 7.

Interposed between the plates 1 and 2, are a plurality of circular leaf or plate springs 8, the number and length of which may vary according to the requirements of use. In the present instance, I have shown the coupling as composed of four circular leaf springs, each making a complete circle, and in practice this is a convenient form in which to make the springs as they may be made in a ring shape and then split radially. These springs 8, are arranged to overlap one another the greater portion of their length and have the opposite ends thereof fastened by means of the rivets 9, or in any other suitable manner to the plates 1 and 2, the points of attachment of the springs being spaced at equal intervals around the plates 1 and 2, for example, as shown in the illustration, in which each spring is fastened to the plate a quarter turn distance from the preceding spring.

With this construction, the plates 1 and 2, are capable of a variable degree of separation, owing to the flexibility of the springs 8, and are likewise capable of variable angular positioning and when the shafts are rotated, the angular relation is compensated for in the flexing of the springs 8, which serve at all times to positively transmit power from one plate 1, to the other plate 2, or vice versa.

The flexible coupling is particularly suited for connecting the drive shaft of an automobile with the transmission shaft and with the rear axle, as the spring suspension of the front and rear axles causes a constant variation in the relative position of the shaft both angularly and lengthwise, and this coupling will readily permit both angular and longitudinal relative movement without friction and there are no parts to wear and become loose due to the constant adjustment.

In Fig. 1, which illustrates my coupling applied to an automobile construction, 10, is the frame of the car; 11, a rear wheel, and 12, the rear axle which is connected by means of the springs, 13, with the frame 10, so that the frame 10, is resiliently supported by the wheels 11. The reference numeral 14, indicates the differential gear casing within which is provided suitable gearing for transmitting power from the shaft 15, to the rear axle 12, for driving the wheels 11; and 16, represents a portion of the transmission case which is mounted on the frame 10, and connected with the engine for driving the automobile. This transmission case has a shaft 17, extending rearwardly therefrom to communicate power to the rear axle 12, and a drive shaft 18, is interposed between the shaft 17, and the stub shaft 15, and connected in a flexible manner with each shaft so that the rear axle 12, is free to move relatively to the frame 10, without interfering with the transmission of power from the shaft 17, to the shaft 15. It will be observed that vertical movement of the axle 12, relative to the frame 10, not only changes the angular relation of the drive shaft 18, with the shafts 17 and 15, but there is also a shortening and lengthening of the distance between the shafts 15 and 17, which has heretofore been provided for by the use of sliding parts in addition to the universal coupling.

With the use of my coupling as indicated in Fig. 1, both the angular and longitudinal changes are provided for without such sliding members, as the spring leaves 8, not only flex so that the shaft may change relative position angularly, but will also contract and expand and permit the necessary separation and approximation of the shafts.

The operation of the device is thought to be quite obvious from the foregoing description and any further explanation of the operation is therefore unnecessary.

I am aware that the details of construction may be varied through a wide range without departing from the principles of this invention. I therefore do not purpose limiting the patent granted otherwise than necessitated by the prior art.

I claim as my invention:—

In a device of the class described, the combination of rotary members adapted to rotate about intersecting axes, and a plurality of overlapping circular plate springs of even diameter interposed between and connecting said rotary members, the points of attachment of said spring plates being spaced at equal intervals around said rotary members and separated less than a semicircle, and each spring plate comprising a complete circle only.

In testimony whereof I have hereunto subscribed my name in the presence of two subscribing witnesses.

CHARLES L. RAYFIELD.

Witnesses:
 CHARLES W. HILL, Jr.,
 FRED E. PAESLER.